United States Patent Office 3,780,009
Patented Dec. 18, 1973

3,780,009
PROCESS FOR POLYMERIZING CYCLOOLEFINS TO POLYALKENAMERS
Gino Dall'Asta, San Giuliano Milanese, Italy, assignor to Montecatini Edison S.p.A., Milan, Italy
No Drawing. Filed Dec. 15, 1971, Ser. No. 208,405
Claims priority, application Italy, Dec. 16, 1970, 33,074/70
Int. Cl. C08f 1/56
U.S. Cl. 260—93.1                                    4 Claims

ABSTRACT OF THE DISCLOSURE

There is disclosed a process for polymerizing cycloolefins to polyalkenamers in contact with catalysts prepared by mixing transition metal compounds and hydrides or organometallic compounds (which may be halogenated) of metals belonging to Groups I, II, III–A and IV–A of the Mendelyeev Periodic Table, and which also include carbon dioxide as activator of the catalytic mixture.

PRIOR ART

It has been suggested in various patents, including some originating with our group (see, for instance, Italian Pat. Nos. 778,370; 805,709; 784,307; and 773,657), to polymerize cycloolefins to polyalkenamers, that is to polymers consisting of unsaturated hydrocarbon monomeric linear units, with the aid of three-component catalysts prepared by mixing compounds of transition metals with organometallic compounds which may be partially halogenated, metal hydrides, or metal halides of metals belonging to any of Groups I, II, III–A and IV–A of the Mendelyeev Periodic Table, and with an activator consisting of an oxygenated compound containing an —O—O— bond, and —O—H— bond, or an ether or epoxy group.

The preferred transition metal compounds for use in preparing such catalysts are compounds of tungsten, molybdenum, tantalum, niobium, rhenium, titanium or zirconium. Oxygenated activators disclosed previously were, for example, peroxides, hydroperoxides, hydrogen peroxide, molecular oxygen, alcohols, phenols, certain organic ethers and epoxides with peroxides and hydroperoxides being preferred. The function of such activators is, mainly, although not exclusively, to increase the cycloolefin polymerization rate and polyalkenamer yield, as well as rendering the polymerization more readily reproducible.

A considerable disadvantage of at least some of the activators proposed heretofore, including at least some of the preferred peroxides and hydroperoxides is in their dangerous explosiveness when used industrially in appreciable quantities. Other of the previously suggested oxygenated activators, if not explosive and therefore potentially dangerous are expensive and use thereof in practice is not advisable due to their high cost.

THE PRESENT INVENTION

One of the objects of this invention was to obviate the above-mentioned disadvantages associated with the use of the previously proposed activators by providing a substituent for the previous activators which is neither explosive nor costly.

This and other objects are achieved by using carbon dioxide as the activator for the catalytic mixture of the transition metal compounds and derivatives of the metals belonging to Groups I, II, III–A and IV–A of the Mendelyeev Periodic Table.

Surprisingly, I have found that in the polymerization of cycloolefins to polyalkenamers, many advantages attend the use, as activator of the catalytic mixture mentioned hereinabove, of either carbon dioxide or a compound which generates carbon dioxide under the conditions, used to polymerize the cycloolefins to polyalkenamers.

Therefore, this invention provides a process for polymerizing cycloolefins to polyalkenamers in contact with a catalytic system prepared from at least three components, as follows:

(1) a transition metal compound;
(2) a hydride, halide or organometallic compound of a metal belonging to any of Groups I, II, III–A and/or IV–A of the Mendelyeev Periodic Table; and
(3) an activator of the catalytic components (1) and (2) which is carbon dioxide as such or a compound which will generate carbon dioxide under the polymerization conditions.

Use of carbon dioxide as component (3) of the catalyst, has many unforeseeable advantages. Among the advantages are the low cost, ready availability in quantities required for polymerization of the cycloolefins on a commercial scale, the fact that its use does not involve the danger of explosions, and the further fact that it is effective in small amounts with respect to both the starting cycloolefin monomers and components (1) and (2) of the catalysts.

The cycloolefins can be polymerized to polyalkenamers in contact with the catalysts of this invention and the activator of which is carbon dioxide at moderate temperatures comprised between —50° C. and +60° C. The polymerization can be carried out in an inert solvent, which may be an aliphatic, cycloaliphatic, aromatic or chlorinated hydrocarbon solvent, or it may be carried out with the monomer in liquid phase and in the essential absence of an extraneous inert polymerization solvent.

In my process, using the catalysts of this invention, the preferred transition metal compounds (catalyst component 1) are compounds of tungsten, molybdenum or tantalum, examples of which are the halides, oxyhalides and alkoxy halides in which the transition metal has a high valence state and such as tungsten hexachloride, tungsten oxytetrachloride, tungsten pentabromide, tungsten hexafluoride, tungsten pentachloride, tungsten tetrachloride, tungsten diethoxytetrachloride, molybdenum pentachloride, molybdenum oxytrichloride, tantalum pentachloride.

All organometallic compounds, metal hydrides and metal halides of the metals belonging to Groups I, II, III–A and IV–A of the Mendelyeev Periodic Table of the Elements which form catalysts of olefin polymerization when mixed with transition metal compounds can be used as component (2) of our catalyst. Examples include such compounds of lithium, beryllium, magnesium, zinc, calcium, boron, aluminum, silicium, tin and lead. The presently preferred compounds are those of aluminum and zinc, such as, for instance, trialkyl aluminum, dialkyl aluminum monochloride, alkyl aluminum sesquichloride, monoalkyl aluminum dichloride, aluminum trichloride, aluminum tribromide, complexes of the aluminum trihalides with Lewis bases, aluminum trihydride, zinc dialkyl, and zinc dichloride.

The molar ratios between the mentioned transition metals compounds and the mentioned compounds of the Groups I, II, III–A and IV–A metals are suitably selected in the range comprised between 1:0.1 and 1:50. The preferred ratios are those ranging from 1:0.5 to 1:10.

The molar ratio between the mentioned transition metals compounds and carbon dioxide is generally comprised between 1:0.1 and 1:10.

The catalysts are preferably prepared by contacting carbon dioxide with the transition metal compound and by subsequently adding the selected compound of the Group I, II, III-A or IV-A metal. The carbon dioxide can be used in the gaseous state or as Dry Ice.

As already indicated, compounds capable of generating carbon dioxide under the polymerization conditions may be employed in place of carbon dioxide itself. For instance, carboxylic acids, their salts or the salts of their derivatives or beta-ketocarboxylic acids, such as acetacetic acid, sodium carbamate, 1,1-cyclopropandicarboxylic acid, can be employed.

Cycloolefins which can be polymerized to polyalkenamers according to this invention are those known to be polymerizable to polyalkenamers by means of the prior art catalysts discussed hereinabove. That includes cyclomonolefins (with the exception of cyclohexene) cyclopolyenes, which are cycloolefins having more than one double bond in the ring, bicycloolefins, alkyl or aryl substituted cycloolefins and mixtures of cycloolefins. Specific cycloolefins polymerizable to polyalkenamers according to the present process are for instance: cyclobutene, cyclopentene, cycloheptene, cyclooctene, cyclodecene, cyclododecene, cyclooctadecene, cyclotetracosene, cyclooctatetracontene, 3-methylcyclooctene, 3-phenylcyclooctene, 3-chlorocyclooctene, 1,5-cyclooctadiene, 1,5,9-cyclododecatriene, norbornene, norbornadiene. Preferred examples of cycloolefins are cyclopentene, cyclooctene and cyclodecene.

The polymers (polyalkenamers) obtained according to this process are useful for any purpose to which the known polyalkenamers are adapted. In particular, polyalkenamers we obtain are sulfur-vulcanizable to elastomers (synthetic rubbers).

The following examples are given to illustrate the invention, and are not intended as limiting.

EXAMPLE 1

The polymerization is carried out in a 2-liter cylindrical reactor provided with an automatic stirrer, a reagents inlet pipe, a gas inlet with fritten bottom located near the bottom of the reactor, and a nitrogen inlet. All operations preceding isolation of the polymer formed are conducted in dry nitrogen atomosphere.

6 moles (530 ml.) of anhydrous cyclopentene, distilled under vacuum, and 10 millimoles of finely ground tungsten hexachloride are introduced into the reactor. Stirring is started and 1.0 liter of gaseous carbon dioxide is bubbled through the mixture for 30 minutes. The non-absorbed carbon dioxide is removed from the reactor free volume by dry nitrogen. After strong stirring and cooling to —30° C., 50 millimoles of diethyl aluminum monochloride are added to the mixture. Polymerization begins shortly after and continues for one hour, when it is interrupted by the addition of 50 ml. of a methanol/38% hydrochloric acid mixture in a 5:1 by volumes ratio. The polymer is coagulated with excess methanol containing 1.0 g. of phenyl-beta-naphthylamine as stabilizer.

The polymer is filtered, washed with methanol containing the same antioxidizing agent and evaporated to dryness at ambient temperature under the vacuum created by a mechanical pump.

298 g. of polymer (73% conversion) soluble in aromatic and chlorinated hydrocarbons are thus obtained. The polymer has the structure of a polypentenamer as determined by both infrared spectroscopic analysis and nuclear magnetic resonance analysis. The polymer double bonds are for 85% of the trans-type and for 15% of the cis-type.

The polymer intrinsic viscosity measured in toluene at 30° C. is 2.7 dl./g.

The polymer is then vulcanized according to the following recipe, wherein the quantities are in parts by weight:

polymer=100; antioxidizing agent phenyl-beta-naphthylamine=1; stearic acid=2; zinc oxide=5; carbon black HAF=50; sulphur=1.5; mercaptobenzothiazole disulphide=1.

Vulcanization is conducted at 150° C. for 40 minutes.
An elastic rubber having the following characteristics is obtained (at 23° C.):

Tensile strength, kg./cm.$^2$ _____ 270
Elongation at break, percent _____ 480
Elastic modulus at 300%, kg./cm.$^2$ _____ 148
Tearing resistance, kg./cm. _____ 48

The elastic rubber is suitable for use in the manufacture of tires and various other industrially valuable articles.

COMPARATIVE EXAMPLE

The polymerization described in Example 1 was repeated, the only exception being that benzoyl peroxide was employed as activator instead of carbon dioxide. More precisely, the operations were carried out under the conditions described hereinbelow, and which are the most favorable conditions attaining the highest percent conversion during the bulk polymerization of the cycloolefin when a peroxide is used as catalyst activator.

A dry nitrogen atmosphere was created inside a flask—provided with stirrer, nitrogen feed pipe and reagents inlet pipe—into which 10 cc. (7.7 g.=113 millimoles) of cyclopentene were introduced.

The whole was cooled to —30° C. and, while the monomer was kept under stirring, 0.094 millimole (0.023 g.) of benzoyl peroxide was introduced into the cooled monomer. Under stirring, 0.188 millimole (0.075 g.) of tungsten hexachloride and 0.94 millimole of diethyl aluminum monochloride were added.

The monomer/tungsten hexachloride molar ratio was 600:1; the diethyl aluminum monochloride/tungsten hexachloride molar ratio was 5:1; the tungsten hexachloride/benzoyl peroxide molar ratio was 1:0.5.

Polymerization was conducted for 1 hour at a temperature of —30° C., then interrupted and the remaining operations carried out according to Example 1.

The product obtained had properties and an appearance like those of the product according to Example 1 and an intrinsic viscosity in toluene at 30° C. of 2.74 dl./g. However the yield was only 4.4 g., equal to a conversion of only 57%.

EXAMPLE 2

The polymerization of cyclopentene to polypentenamer is carried out according to Example 1, but carbon dioxide is introduced into the cyclopentene and WCl$_6$ mixture in the form of 5 g. solid Dry Ice.

The polymer is isolated as described in Example 1.

302 g. of polymer (74% conversion) having the structure of a polypentenamer are obtained, the double bonds in which are for 90% of the trans-type and for 10% of the cis-type. The polymer intrinsic viscosity of the polymer, in toluene at 30° C., is 2.1 dl./g.

It can be vulcanized with the same recipe as given in Example 1, to obtain an elastic rubber having mechanical characteristics like those illustrated in Example 1.

EXAMPLE 3

Cyclopentene is polymerized to polypentenamer according to Example 1, except that, instead of diethyl aluminum monochloride, 20 millimoles of triethyl aluminum are used.

By operating as described in Example 1, 229 g. (55% conversion) of a polypentenamer the double bonds of which are for 84% of the trans-type and 16% of the cis-type, and having an intrinsic viscosity, in toluene at 30° C., of 1.9 dl./g., is obtained.

The polymer can be vulcanized as in Example 1, and yields an elastic rubber having properties similar to those reported in Example 1.

EXAMPLE 4

Example 1 is repeated, but using 50 millimoles of monoethyl aluminum dichloride instead of diethyl aluminum monochloride. 330 g. (79% conversion) of a polypentenamer are obtained, wherein 86% of the double bonds are trans-type and 14% are of cis-type.

The intrinsic viscosity in toluene at 30° C. is 2.1 dl./g.

The polymer can be vulcanized with the recipe given in Example 1, and yields elastic rubbers the properties of which are similar to those given in Example 1.

EXAMPLE 5

Operating according to Example 1, but using 50 millimoles of anhydrous aluminum trichloride instead of diethyl aluminum monochloride, 133 g. (32% conversion) of a polypentenamer 80% of the double bonds of which are trans, and 20% are cis, are obtained. The intrinsic viscosity in toluene at 30° C. is 1.4 dl./g.

EXAMPLE 6

Proceeding as in Example 1, but using 20 millimoles of di-n-hexyl zinc instead of diethyl aluminum monochloride, one obtains 98 g. (24% conversion) of a polypentenamer in which 75% of the double bonds are trans-type and 25% are of cis-type. The intrinsic viscosity in toluene at 30° C. is 1.2 dl./g.

EXAMPLE 7

Example 1 is repeated except that 50 millimoles of tri-n-hexyl tin monohydride are substituted for the diethyl aluminum monochloride. 116 g. (28% conversion) of a polypentenamer are obtained. The double bonds therein are prevailingly of the trans-type, and the intrinsic viscosity thereof in toluene at 30° C. is 1.8 dl./g.

EXAMPLE 8

Operating according to Example 1, but instead of diethyl aluminum monochloride, using 20 millimoles of n-butyl lithium. 56 g. (13% conversion) of a polypentenamer are obtained; the double bonds of this polymer have a prevailingly trans-structure and its intrinsic viscosity in toluene at 30° C. is 0.9 dl./g.

EXAMPLE 9

Operating as in Example 1, but replacing tungsten hexachloride, with the same amount of molybdenum pentachloride. 29 g. (22% conversion) of a polypentenamer having double bonds prevailingly of the cis-type and an intrinsic viscosity in toluene at 30° C. of 1.4 dl./g. are obtained.

EXAMPLE 10

Repeating Example 1, but substituting, for the tungsten hexachloride, the same amount of tantalum pentachloride, 118 g. (28% conversion) of a polypentenamer having double bonds prevailingly of the trans-type and an intrinsic viscosity in toluene at 30° C. of 1.3 dl./g. are obtained.

EXAMPLE 11

In this run, 500 ml. of anhydrous cyclohexane are used as polymerization solvent. The subsequent operations are carried out under the conditions specified in Example 1, except that instead of tungsten hexachloride the same quantity of tungsten oxytetrachloride is employed. 272 g. (65% conversion) of a polypentenamer essentially all of the double bonds of which are of the trans-type are obtained. The intrinsic viscosity in toluene at 30° C. is 2.1 dl./g.

EXAMPLE 12

Using other reagents as in Example 1, 3 moles of cyclooctene are polymerized at 30° C. for 24 hours. The polymer is isolated as in Example 1. 49 g. (15% conversion) which, on the basis of infrared and nuclear magnetic resonance analyses, has the structure of a polyoctenamer in which, prevailingly, the double bonds are trans-type and which has an intrinsic viscosity in toluene at 30° C. of 1.6 dl./g.

As will be apparent, changes in details may be made in practicing the present invention without departing from its spirit. Therefore, I intend to include in the scope of the appended claims all such changes and modifications as will be obvious to those skilled in the art from the description and illustrative working examples given below.

What is claimed is:

1. A process for polymerizing a cycloolefin selected from the group consisting of cyclobutene, cyclopentene, cycloheptene, cyclooctene, cyclodecene and cyclododecene to a polyalkenamer which comprises effecting the polymerization in an inert solvent selected from the group consisting of aliphatic, aromatic and cyclo-aliphatic solvents and chlorinated hydrocarbon solvents, at a temperature of from 50° C. to +60° C., and in contact with a catalytic system prepared by mixing
    (1) a transition metal compound selected from the group consisting of the metal halides, oxyhalides and alkoxy halides with
    (2) a compound of a metal belonging to any of Groups I, II, III–A and IV–A of the Mendelyeev Periodic Table and selected from the group consisting of the metal hydrides, organometallic compounds of the metals, and the metal halides; and with
    (3) an activator of the catalytic mixture selected from the group consisting of carbon dioxide and compounds which generate carbon dioxide under the aforesaid cycloolefin polymerization conditions, the molar ratio between the transition metal compound and carbon dioxide used as such or generated in situ being from 1:01 to 1:10 and the molar ratio between the transition metal compound and the component (2) being from 1:0.1 to 1:50.

2. The process according to claim 1, in which in the transition metal compound (1) the transition metal is in high valency state.

3. The process according to claim 1, further characterized in that the catalyst is prepared by contacting carbon dioxide with the transition metal compound and thereafter adding the compound of the metal belonging to Group I, II, III–A or IV–A.

4. The process according to claim 1, characterized in that the activator (3) is a compound which generates carbon dioxide under the conditions of the cycloolefin polymerization and is selected from the group consisting of carboxylic acids, salts of such acids, and beta-ketocarboxylic acids.

References Cited
UNITED STATES PATENTS
3,400,084    9/1968    Fukumoto et al. _____ 252—429

JOSEPH L. SCHOFER, Primary Examiner

S. M. LEVIN, Assistant Examiner

U.S. Cl. X.R.

260—23 R, 33.6 UA, 33.8 UA

UNITED STATES PATENT OFFICE
CERTIFICATE OF CORRECTION

Patent No. 3,780,009      Dated Issued December 18, 1973

Inventor(s) Gino Dall'Asta

It is certified that error appears in the above-identified patent and that said Letters Patent are hereby corrected as shown below:

Claim 1, line 8, the temperature range "50 °C to +60 °C" should be - - - -50 °C to +60 °C - - -.

Signed and sealed this 10th day of December 1974.

(SEAL)
Attest:

McCOY M. GIBSON JR.
Attesting Officer

C. MARSHALL DANN
Commissioner of Patents